US012782175B2

(12) United States Patent
Rieger

(10) Patent No.: US 12,782,175 B2
(45) Date of Patent: Nov. 3, 2026

(54) SENSOR FOR USE IN FLUID FLOW PARAMETER MEASURING SYSTEM, FOR DETECTING PRESSURE FLUCTUATIONS IN FLUID FLOWING IN PIPELINE

(71) Applicant: Endress+Hauser Flowtec AG, Reinach (CH)

(72) Inventor: Anton Rieger, Weil am Rhein (DE)

(73) Assignee: Endress+Hauser Flowtec AG, Reinach (CH)

( * ) Notice: Subject to any disclaimer, the term of this patent is extended or adjusted under 35 U.S.C. 154(b) by 154 days.

(21) Appl. No.: 18/843,958

(22) PCT Filed: Feb. 24, 2023

(86) PCT No.: PCT/EP2023/054641

§ 371 (c)(1),
(2) Date: Sep. 4, 2024

(87) PCT Pub. No.: WO2023/165901

PCT Pub. Date: Sep. 7, 2023

(65) Prior Publication Data

US 2026/0146875 A1 May 28, 2026

(30) Foreign Application Priority Data

Mar. 4, 2022 (DE) ..................... 10 2022 105 199.4

(51) Int. Cl.
*G01F 1/32* (2022.01)
*G01F 1/325* (2022.01)
(Continued)

(52) U.S. Cl.
CPC .......... *G01F 1/3209* (2013.01); *G01F 1/3266* (2022.01); *G01F 15/006* (2013.01); *G01F 15/185* (2013.01)

(58) Field of Classification Search
CPC .... G01F 15/185; G01F 15/006; G01F 1/3266; G01F 1/3209; G01F 1/3218; G01F 1/662;
(Continued)

(56) References Cited

U.S. PATENT DOCUMENTS 3,349,259 A 10/1967 Kistler
4,986,134 A 1/1991 Lew
(Continued)

FOREIGN PATENT DOCUMENTS

CN 86101855 A 10/1987
CN 103196498 A 7/2013
(Continued)

OTHER PUBLICATIONS

Ball washers, conical cups, DIN 6319:2001-10, Deutsches Institut für Normung e.V., Oct. 2001.

*Primary Examiner* — Brandi N Hopkins
(74) *Attorney, Agent, or Firm* — Christopher R. Powers; Endress+Hauser (USA) Holding, Inc.

(57) ABSTRACT

A sensor includes: a deformation element; a sensor lug extending from the deformation element; a connection sleeve extending from the deformation element; a transducer element, arranged within the connection sleeve and contacting the deformation element, for generating an electrical sensor signal representing temporally changing movements of the sensor lug and/or temporally changing deformations of the deformation element; and fastening means within the connection sleeve and mechanically connected thereto for fixing the transducer element in the connection sleeve. The connection sleeve has an internal thread in a distal end, and the fastening means includes a threaded sleeve with an external thread and a cylindrical add-on element. The threaded sleeve is screwed into the internal thread with the add-on element between the threaded sleeve and the transducer element such that the add-on element is elastically
(Continued)

deformed by a contact pressing force which holds the transducer element against the deformation element.

25 Claims, 4 Drawing Sheets

(51) Int. Cl.
*G01F 15/00* (2006.01)
*G01F 15/18* (2006.01)

(58) Field of Classification Search
CPC .......... G01F 1/6842; G01F 15/02; G01F 5/00; G01F 1/383; G01F 1/3282; G01F 1/325; G01F 1/68; G01F 1/66; G01F 15/00; G01L 9/0075; G01L 9/0002; G01L 9/0051; G01L 23/18; G01L 19/0618; G01L 9/0052; G01L 9/0001; G01L 23/08; G01L 1/16; B29B 13/024; G01P 5/01; G01N 29/028; G01N 29/2462; F16J 15/04; H02K 35/02
See application file for complete search history.

(56) References Cited

U.S. PATENT DOCUMENTS

| | | | | |
|---|---|---|---|---|
| 5,313,843 | A | 5/1994 | Tsuruoka et al. | |
| 2008/0072686 | A1* | 3/2008 | Hoecker | G01F 1/3209 73/861.22 |
| 2016/0123783 | A1 | 5/2016 | Strub et al. | |
| 2017/0141911 | A1* | 5/2017 | Michiels | H04L 9/0625 |
| 2017/0284841 | A1 | 10/2017 | Lais | |
| 2022/0057240 | A1* | 2/2022 | Hollmach | G01F 1/3266 |

FOREIGN PATENT DOCUMENTS

| | | | | |
|---|---|---|---|---|
| CN | 103196498 | A1 | 7/2013 | |
| CN | 203824592 | U | 9/2014 | |
| CN | 106404082 | A | 2/2017 | |
| DE | 102020134264 | A1 | 6/2022 | |
| EP | 0319424 | A2 | 6/1989 | |
| EP | 2257775 | A1 | 12/2010 | |
| JP | 4361120 | A | 12/1992 | |
| JP | 4361120 | B2 | 11/2009 | |
| RU | 45522 | U1 | 5/2005 | |
| RU | 47097 | U1 | 8/2005 | |
| WO | WO-2017153124 | A1 * | 9/2017 | G01F 1/3218 |

* cited by examiner

SENSOR FOR USE IN FLUID FLOW PARAMETER MEASURING SYSTEM, FOR DETECTING PRESSURE FLUCTUATIONS IN FLUID FLOWING IN PIPELINE

CROSS-REFERENCE TO RELATED APPLICATIONS

The present application is related to and claims the priority benefit of German Patent Application No. 10 2022 105 199.4, filed Mar. 4, 2022, and International Patent Application No. PCT/EP2023/054641, filed Feb. 24, 2023, the entire contents of which are incorporated herein by reference.

TECHNICAL FIELD

The invention relates to a formed sensor, in particular a sensor for detecting pressure fluctuations in a flowing fluid and, respectively, to a measurement system formed therewith.

BACKGROUND

In process measurement and automation technology, measurement systems designed as vortex flow meters are often used for the measurement of flow velocities of fluids flowing in pipes, especially fast-flowing and/or hot gases and/or fluid flows of high Reynolds number (Re), or of volume flow rates or mass flow rates corresponding to a respective flow velocity (u). Examples of such measurement systems are known, inter alia, from US-A 2006/0230841, US-A 2008/0072686, US-A 2011/0154913, US-A 2011/0247430, US-A 2016/0123783, US-A 2017/0284841, US-A 2019/0094054, US-A 60 03 384, US-A 61 01 885, US-B 63 52 000, US-B 69 10 387, or US-B 69 38 496 and are also offered, inter alia, by the applicant—for example, under the trade names "PROWIRL D 200," "PROWIRL F 200," "PROWIRL O 200," "PROWIRL R 200" (http://www.de.endress.com/#products/prowirl).

Each of the measurement systems shown has a resistance element, which protrudes into the lumen of the respective pipe, viz., for example, designed as a system component of a heat supply network or of a turbine circuit or into a lumen of a measurement tube used in the course of said pipe, against which resistance element fluid flows to generate vortices that are lined up to form a so-called Kármán vortex street within the partial volume of the fluid flow flowing directly downstream of the resistance element. As is known, the vortices are generated at the resistance element at a separation rate ($1/f_{Vtx}$) that is dependent upon the flow velocity. Furthermore, the measurement systems have a sensor that is integrated into the resistance element or connected therewith or downstream thereof, viz., in the region of the Kármán vortex street in the flow, thus in lumens of the projecting sensor, which sensor is used to detect pressure fluctuations in the Karman vortex street formed in the flowing fluid and to convert them into a sensor signal representing the pressure fluctuations, viz., to supply a-here, for example, electrical or optical-signal that corresponds to a pressure prevailing within the fluid, which, due to opposing vortices, is subjected to periodic fluctuations downstream of the resistance element, or has a signal frequency ($\sim f_{Vtx}$) corresponding to the separation rate of the vortices.

For this purpose, the sensor has a deformation element and a usually rod-shaped, planar, or wedge-shaped sensor lug extending starting from a substantially planar surface of the deformation element, and is designed to detect pressure fluctuations in the Karman vortex street, viz., to convert them into movements of the deformation element corresponding to the pressure fluctuations. The deformation element has an outer edge segment, usually circular-ring-shaped, which is configured to be hermetically sealed, e.g., integrally bonded, to a socket that is used to hold the deformation element on a wall of a tube such that the deformation element covers and hermetically seals an opening provided in the wall of the tube and that the surface of the deformation element supporting the sensor lug faces the fluid-carrying lumen of the measurement tube or the pipe, and therefore the sensor lug projects into said lumen. The deformation element is typically designed as a thin membrane and is shaped such that at least one membrane thickness, measured as a minimum thickness of an inner membrane segment delimited by the above-mentioned outer edge segment, is much smaller than a membrane diameter, measured as a largest diameter of a surface delimited by the outer edge segment. In order to achieve the highest possible measurement sensitivity, viz., a highest possible sensitivity of the sensor to the pressure fluctuations to be detected and, at the same time, an as high as possible mechanical natural frequency, which is above the highest separation rate to be measured, for the bending oscillation mode of the deformation element, which is forced by the pressure fluctuations, with the sensor lug, such deformation elements of established measurement systems typically have a diameter-to-thickness ratio, which is approximately on the order of 20:1. As shown, inter alia, in the above-mentioned US-A 2016/0123783, US-A 2017/0284841, US-A 2019/0094054, or US-B 63 52 000, sensors of the type in question can occasionally also have a usually rod-shaped, planar, or sleeve-shaped compensating element that extends from a surface, facing away from the surface supporting the sensor lug, of the deformation element and is used especially to compensate for forces or moments resulting from movements of the sensor assembly, e.g., as a result of vibrations of the pipe, or to avoid undesired movements of the sensor lug resulting therefrom.

For the purpose of generating the sensor signal, each of the sensors further comprises a (mechanical-to-electrical) transducer element, which is typically configured to detect movements of the deformation element and convert them into an electrical sensor signal. In the sensors known from US-A 2017/0284841, US-A 2019/0094054, or US-B 63 52 000, said transducer element is formed by means of a piezo ceramic—for example, in the form of a piezo disk.

On a side facing away from the fluid-carrying lumen, the sensor is furthermore connected to a transducer electronics system, which is typically encapsulated in a pressure-tight and impact-proof manner and optionally also hermetically sealed towards the outside. Transducer electronics of measurement systems that are suitable for industrial applications usually have a corresponding digital measurement circuit, which is electrically connected to the transducer element via connection lines, optionally with the interposition of electrical barriers and/or galvanic isolation points, for processing the at least one sensor signal generated by the transducer element and for generating digital measurement values for the measured variable to be detected in each case, viz., the flow velocity, the volume flow rate, and/or the mass flow rate. The transducer electronics system, usually accommodated in a protective housing made of metal and/or impact-resistant plastic, of measurement systems suitable for industry or established in industrial measurement technology also usually provide external interfaces conforming to an industry standard, e.g., DIN IEC 60381-1, for communication with higher-level measurement and/or regulator systems—for example, formed by means of programmable-logic controllers (PLC). Such an external interface can be designed, for example, as a two-wire connection that can be incorporated into a current loop and/or be compatible with established industrial field buses.

Not least because of the relatively high diameter-to-thickness ratios of the deformation element, which are due to the measurement principle, conventional sensors of the type in question-even when using a high-strength nickel-based alloy, such as, for example, Inconel 718 (Special Metals Corp.), as material-usually have a compressive strength, viz., a maximum permissible operating pressure, above which a non-reversible plastic deformation of the sensor or even a bursting of the deformation element is to be provided, which may be too low for the extremely high pressures or pressure shocks that occasionally actually occur in certain applications, or such sensors show a dependence of said compressive strength upon the operating temperature (pressure-temperature curve), which dependence is too inconvenient for such applications, such that, for example, for operating pressures above 100 bar, which occur in actually predestined hot steam applications with steam temperatures of above 200° C., nondestructive resistance can occasionally no longer be guaranteed—for example, as a result of condensation-induced water hammers (CIWH).

To improve the compressive strength of the sensor, US-A 2016/0123783 discloses, for example, a support device for the deformation element, which is arranged on the transducer element side and is therefore not contacted during operation by the fluid to be measured, against which support device the deformation element is partially applied at a static pressure of, for example, more than 40 bar above a predetermined limit value, such that mechanical stresses established therein can be maintained below a specified maximum permissible voltage even at higher pressures of up to 250 bar. One disadvantage of this solution, however, is that the sensitivity of the sensor is initially reduced abruptly when the above-mentioned limit value is exceeded, and that therefore the sensor shows a sensitivity, which is dependent upon the pressure and is also non-linear, to the flow velocity or the volume flow rate.

SUMMARY

Proceeding from this, one object of the invention is to improve sensors with the transducer element positioned on the deformation element such that they show a high compressive strength even in case of a comparatively simple mechanical structure, or a dependence of the compressive strength upon the operating temperature that will allow for the sensors to be used even in hot steam applications with steam temperatures of above 200° C. and pressure peaks of above 100 bar. In addition, the sensor should be able to be assembled in a simple manner from individual components—for example, also in order to be able to easily replace a defective transducer element with an intact new transducer element.

To achieve this object, the invention relates to a sensor, especially a sensor for detecting pressure fluctuations in a Karman vortex street formed in a flowing fluid, which sensor comprises:

- a deformation element that is flat at least in sections, e.g., membrane-like or disk-shaped, made, for example, of a metal, having a planar first surface and an opposite planar second surface;
- a, for example, rod-shaped or planar or wedge-shaped sensor lug extending starting from the first surface of the deformation element;
- a connection sleeve extending starting from the deformation element, e.g., connected thereto in an electrically conductive manner—for example, made of a metal and/or of a material having a (linear) thermal expansion coefficient of not less than $16 \cdot 10^{-6}$ $K^{-1}$ and/or not more than $17 \cdot 10^{-6}$ $K^{-1}$ at least within a temperature range of between −10° C. and 250° C.;
- a transducer element which is arranged within the connection sleeve, contacts the second surface of the deformation element with a first contact face, e.g., electrically conductively, and is for example disk-shaped and/or piezoceramic, and for example made of a material having a (linear) thermal expansion coefficient of not less than $6 \cdot 10^{-6}$ $K^{-1}$ and/or not more than $6 \cdot 10^{-6}$ $K^{-1}$ at least within a temperature range of between −10° C. and 250° C., for generating temporally changing, e.g., at least temporarily periodic, movements of the sensor lug and/or a temporally changing, e.g., at least temporarily periodic, electrical sensor signal representing deformations of the deformation element, and/or for generating a force causing deformations of the deformation element (inverse piezo effect);
- and fastening means, which are positioned within the connection sleeve and are, for example, releasably, mechanically connected thereto, for—for example, releasably—fixing the transducer element in the connection sleeve.

In the sensor according to the invention, the connection sleeve has an internal thread in a distal end remote from the deformation element, and the fastening means also comprise an (inner) threaded sleeve having an external thread and a cylindrical, e.g., monolithic and/or disk-shaped and/or metallic, add-on element—for example, made of a metal and/or of a material having a (linear) thermal expansion coefficient of not less than $20 \cdot 10^{-6}$ $K^{-1}$ and/or not more than $30 \cdot 10^{-6}$ $K^{-1}$ at least within a temperature range between −10° C. and 250° C. In addition, the (inner) threaded sleeve is screwed into the internal thread and the add-on element is positioned between the (inner) threaded sleeve, such that an abutment for the add-on element is formed by means of the (inner) threaded sleeve, and at least the add-on element is elastically deformed by exerting a contact pressing force that holds the transducer element pressed against the deformation element or is elastically deformed by forming at least a frictional connection that connects the transducer element and the deformation element to each other, e.g., such that a minimum surface pressure acting between the add-on element and the transducer element or between the transducer element and the deformation element is more than 1 MPa, and/or a maximum surface pressure acting between the add-on element and the transducer element or between the transducer element and the deformation element is less than 20 MPa, and/or such that a frictional connection is formed between the transducer element and the deformation element.

In addition, the invention also relates to a measurement system formed by means of a sensor according to the invention that serves for detecting pressure fluctuations in the flowing fluid, viz., for example, for detecting pressure fluctuations in a Kármán vortex street formed in the flowing fluid, which measurement system is meant for measuring at least one, e.g., temporally variable, flow parameter, e.g., a flow velocity and/or a volume flow rate, of a fluid flowing in a pipeline, the measurement system further comprising a measurement electronics system electrically connected to the transducer element of the sensor, which measurement electronics system is designed to receive the sensor signal from the sensor and to process it, viz., for example, to generate measurement values representing the at least one flow parameter, and/or to feed an electrical driver signal into the transducer element—for example, to generate a force causing deformation of the deformation element. The measurement system according to the invention can especially also be used for measuring a flow parameter—viz., for example, a flow velocity and/or a volume flow rate and/or a mass flow rate—of a fluid, e.g., a steam, flowing in a pipeline—for example, at least temporarily a temperature of more than 200° C. and/or acting at least temporarily with a pressure of more than 100 bar upon the deformation element and/or the sensor lug of the sensor.

According to a first embodiment of the sensor of the invention, it is provided that the transducer element have a (first) thickness d12, e.g., not less than 0.5 mm and/or not more than 2 mm, measured at a temperature of 20° C. as the maximum expansion in the direction of a normal of its first contact face, and the add-on element have a (second) thickness d133, e.g., not less than 1 mm and/or not more than 10 mm, measured at a temperature of 20° C. as the maximum expansion in the direction of the normal of the first contact face of the transducer element, and it is further provided that the transducer element and the add-on element be designed such that an expansion difference ratio $\Delta\alpha21/\Delta\alpha31$ (of the sensor), measured as a ratio of a difference between a (linear) thermal expansion coefficient $\alpha2$ (of the material) of the transducer element and a (linear) thermal expansion coefficient $\alpha1$ (of the material) of the connection sleeve to a difference between a (linear) thermal expansion coefficient $\alpha3$ (of the material) of the add-on element and the (linear) thermal expansion coefficient $\alpha1$ (of the material) of the connection sleeve, e.g., at least within a temperature range between −10° C. and 250° C., fulfills a condition dependent upon a (fine-tuning) parameter k1:

$$\frac{d_{133}}{d_{12}} = -k1 \cdot \frac{\Delta\alpha_{21}}{\Delta\alpha_{31}} = -k1 \cdot \frac{\alpha_2 - \alpha_1}{\alpha_3 - \alpha_1}$$

where the (fine-tuning) parameter k1 is not less than 0.5 and not greater than 1.5, in particular greater than 0.7 and/or less than 1.2. As a development of this embodiment of the invention, it is further provided that a (thickness) ratio $d_{113}/d_{12}$ of the (first) thickness $d_{113}$ of the add-on element to the (second) thickness $d_{12}$ of the transducer element be more than 0.5 and less than 7—for example, viz., not less than 2 and/or not more than 4.

According to a second embodiment of the sensor of the invention, it is further provided that the fastening means comprise a, for example, annular, spherical disk, e.g., made of a metal and/or of a material having a (linear) thermal expansion coefficient $\alpha4$ of not less than $16 \cdot 10^{-6}\ K^{-1}$ and/or not more than $17 \cdot 10^{-6}\ K^{-1}$ at least within a temperature range between −10° C. and 250° C., and that the spherical disk be positioned between the threaded sleeve and the add-on element. As a development of this embodiment of the invention, it is further provided that the spherical disk consist at least partially, e.g., predominantly or completely, of a metal, e.g., a stainless steel or a nickel-based alloy, and/or that a (linear) thermal expansion coefficient $\alpha4$ (of the material) of the spherical disk deviate from a (linear) thermal expansion coefficient $\alpha1$ (of the material) of the connection sleeve by less than $2 \cdot 10^{-6}\ K^{-1}$ and/or by less than 10% of the thermal expansion coefficient $\alpha1$ (of the material) of the connection sleeve, at least within a temperature range between −10° C. and 250° C.

According to a third embodiment of the sensor of the invention, it is further provided that the fastening means comprise an, in particular annular, insulating disk (135), in particular made of a ceramic and/or a plastic and/or made of a material having a (linear) thermal expansion coefficient $\alpha5$ of not less than $30 \cdot 10^{-6}\ K^{-1}$ and/or not more than $50 \cdot 10^{-6}\ K^{-1}$ at least within a temperature range between −10° C. and 250° C., and that the insulating disk be positioned between the transducer element and the add-on element. As a development of this embodiment of the invention, it is further provided that the insulating disk consist at least partially, e.g., also predominantly or completely, of a plastic, in particular a polyimide (Kapton), in particular a plastic that is resistant to high temperatures and/or has a (linear) thermal expansion coefficient $\alpha5$ of not less than $20 \cdot 10^{-6}\ K^{-1}$ and/or not more than $40 \cdot 10^{-6}\ K^{-1}$ at least within a temperature range between −10° C. and 250° C., and/or that a (linear) thermal expansion coefficient $\alpha5$ (of the material) of the insulating disk differ from a (linear) thermal expansion coefficient $\alpha2$ (of the material) of the add-on element by less than $20 \cdot 10^{-6}\ K^{-1}$ and/or by less than 50% of the (linear) thermal expansion coefficient $\alpha2$ (of the material) of the add-on element at least within a temperature range between −10° C. and 250° C. Alternatively or additionally, the insulating disk may also have a (third) thickness, measured at a temperature of 20° C. as the maximum extension in the direction of the normal of the first contact face of the transducer element, which thickness is not less than 0.05 mm and/or not more than 0.5 mm.

According to a fourth embodiment of the sensor of the invention, it is further provided for the deformation element and sensor lug to be integrally bonded to one another, viz., for example, welded or soldered to one another.

According to a fifth embodiment of the sensor of the invention, it is further provided for the transducer element and the deformation element to not be integrally bonded to one another.

According to a sixth embodiment of the invention, it is further provided for the transducer element and the add-on element to not be integrally bonded to one another.

According to a seventh embodiment of the sensor of the invention, it is further provided for the add-on element and the deformation element to consist of different materials.

According to an eighth embodiment of the sensor of the invention, it is further provided that the add-on element consist of an aluminum alloy—for example, an aluminum-magnesium-silicon alloy (AIMgSi) or a wrought aluminum alloy of the (standardized) type EN AW-6061 (AIMg1SiCu), EN AW-6082, EN AW-7075, or EN AW-5052.

According to a ninth embodiment of the sensor of the invention, it is further provided that the add-on element consist of a metal—for example, aluminum or an aluminum alloy.

According to a tenth embodiment of the sensor of the invention, it is further provided for the deformation element to consist at least partially, e.g., predominantly or completely, of a metal—for example, stainless steel or a nickel-based alloy.

According to an eleventh embodiment of the sensor of the invention, it is further provided for the sensor lug to consist at least partially, e.g., predominantly or completely, of a metal—for example, stainless steel or a nickel-based alloy.

According to a twelfth embodiment of the sensor of the invention, it is further provided for the connection sleeve to consist at least partially, e.g., predominantly or completely, of a metal—for example, stainless steel or a nickel-based alloy.

According to a thirteenth embodiment of the sensor of the invention, it is further provided for the deformation element and sensor lug, e.g., the connection sleeve, deformation element, and sensor lug, to consist of an identical material.

According to a fourteenth embodiment of the sensor of the invention, it is further provided for the deformation element and sensor lug, e.g., the connection sleeve, deformation element, and sensor lug, to be components of one and the same monolithic molded part.

According to a fifteenth embodiment of the sensor of the invention, it is further provided that a minimum surface pressure acting between the add-on element and the transducer element or between the transducer element and the deformation element, in particular at a temperature above −50° C. and below 250° C., be more than 1 MPa—for example, even more than 3 MPa.

According to a sixteenth embodiment of the sensor of the invention, it is further provided that a maximum surface pressure acting between the add-on element and the transducer element or between the transducer element and the deformation element, in particular at a temperature above −50° C. and below 250° C., be less than 20 MPa—for example, even less than 15 MPa.

According to a seventeenth embodiment of the sensor of the invention, it is further provided for the transducer element to contact the deformation element and/or the connection sleeve in an electrically conductive manner.

According to a first development of the sensor of the invention, the sensor further comprises a metal foil—for example, a silver foil.

According to a second development of the sensor of the invention, the sensor further comprises a, for example, rod-shaped or planar or sleeve-shaped compensating element extending from the second surface of the deformation element for compensating for forces and/or torques resulting from common movements of the deformation element and the sensor lug.

According to a first embodiment of the first development of the invention, it is further provided for the compensating element to extend through the add-on element, e.g., in such a way that a main axis of inertia (viz., for example, a longitudinal axis) of the compensating element and a main axis of inertia (viz., for example, a longitudinal axis) of the add-on element run parallel to one another, viz., for example, be coincident, and/or in such a way that the add-on element and the compensating element do not contact one another.

According to a second embodiment of the first development of the invention, it is further provided for the deformation element and compensating element to be integrally bonded to one another, viz., for example, welded or soldered to one another.

According to a third embodiment of the first development of the invention, it is further provided for the sensor lug and the compensating element to be arranged in alignment with one another.

According to a fourth embodiment of the first development of the invention, it is further provided for the compensating element and the deformation element to be positioned and aligned with respect to one another in such a way that a main axis of inertia of the deformation element runs as an extension parallel to a main axis of inertia of the compensating element, viz., for example, coincides therewith.

According to a fifth embodiment of the first development of the invention, it is further provided for the deformation element and the compensating element to be components of one and the same monolithic molded part—for example, in such a way that the sensor lug, deformation element, and compensating element and/or that the connection sleeve, deformation element, and compensating element are components of said molded part.

According to a sixth embodiment of the first development of the invention, it is further provided for the compensating element to consist at least partially, e.g., predominantly or completely, of a metal—for example, stainless steel or a nickel-based alloy.

According to a seventh embodiment of the first development of the invention, it is further provided for the deformation element and the compensating element to consist of an identical material—for example, such that the sensor lug, deformation element, and compensating element and/or the connection sleeve, deformation element, and compensating element consist of the same material.

According to a development of the measurement system of the invention, the measurement system further comprises a tube which can be inserted into the course of said pipeline and has a lumen which is designed to guide the fluid flowing in the pipeline.

According to a first embodiment of the development of the measurement system of the invention, it is further provided for the sensor to be inserted into said tube in such a way that the first surface of the deformation element faces the lumen of the tube and that the sensor lug projects into said lumen.

According to a second embodiment of the development of the measurement system of the invention, it is further provided that an opening be formed in the wall of the tube, especially an opening having a socket which serves to hold the deformation element on the wall, and that the sensor be inserted into said opening in such a way that the deformation element covers, in particular hermetically seals, the opening, and that the first surface of the deformation element faces the lumen of the tube, and therefore the sensor lug projects into said lumen.

According to a third embodiment of the development of the measurement system of the invention, it is further provided for the sensor lug to have a length, measured as a minimum distance between a proximal end of the sensor lug, which end adjoins the deformation element, up to a distal end of the sensor lug, which end is remote from the deformation element or its surface, which length corresponds to less than 95% of a caliber of the tube and/or more than one half of said caliber.

According to a fourth embodiment of the development of the measurement system of the invention, it is further provided for the measurement system to further have a resistance element arranged in the lumen of the tube, e.g., upstream, viz., in the (main) direction of flow upstream of the sensor, which resistance element is designed to bring about a Kármán vortex street in the flowing fluid, wherein the sensor is configured to detect periodic pressure fluctuations in the Kármán vortex street and convert them into a sensor signal, e.g., in such a way that the sensor signal has a signal frequency corresponding to a separation rate of vortices on the resistance element, which vortices form the Kármán vortex street.

A basic idea of the invention is to achieve the desired high nominal pressure resistance for sensors, not least including at high operating temperatures of over 200° C., or the desired improvement in the dependence of the pressure resistance of the sensor assembly upon the operating temperature (pressure-temperature curve of the sensor assembly) by holding a transducer element arranged on the deformation element by means of an (inner) threaded sleeve and a (disk-shaped or sleeve-shaped) add-on element, e.g., in the form of an (aluminum) washer, pressed against the deformation element over a comparatively wide temperature range, e.g., from −10° C. to 250° C., continuously with a surface pressure that is suitable, viz., both sufficient and compatible, for the measurement principle. One of the advantages of the invention is not only that it can result in a significant improvement in the nominal compressive strength or in the pressure-temperature curve of sensors of the type in question, but that this is achieved without notably reducing the measurement sensitivity, i.e., the sensitivity of the sensor to the pressure fluctuations actually to be detected. Another advantage of the invention is also to be seen in the fact that, with the sensor according to the invention, defective components, e.g., the transducer element or the fastening means, can be replaced very easily—for example, even on site.

BRIEF DESCRIPTION OF THE DRAWINGS

The invention as well as advantageous embodiments thereof are explained in more detail below based upon exemplary embodiments shown in the figures of the drawing. Identical or identically acting or identically functioning parts are provided with the same reference signs in all figures; for reasons of clarity or if it appears sensible for other reasons, reference signs mentioned before are dispensed with in subsequent figures. Further advantageous embodiments or further developments, especially combinations of partial aspects of the invention that were initially explained only separately, furthermore emerge from the figures of the drawing and/or from the claims. In the figures, in detail:

DETAILED DESCRIPTION

Figure 1:
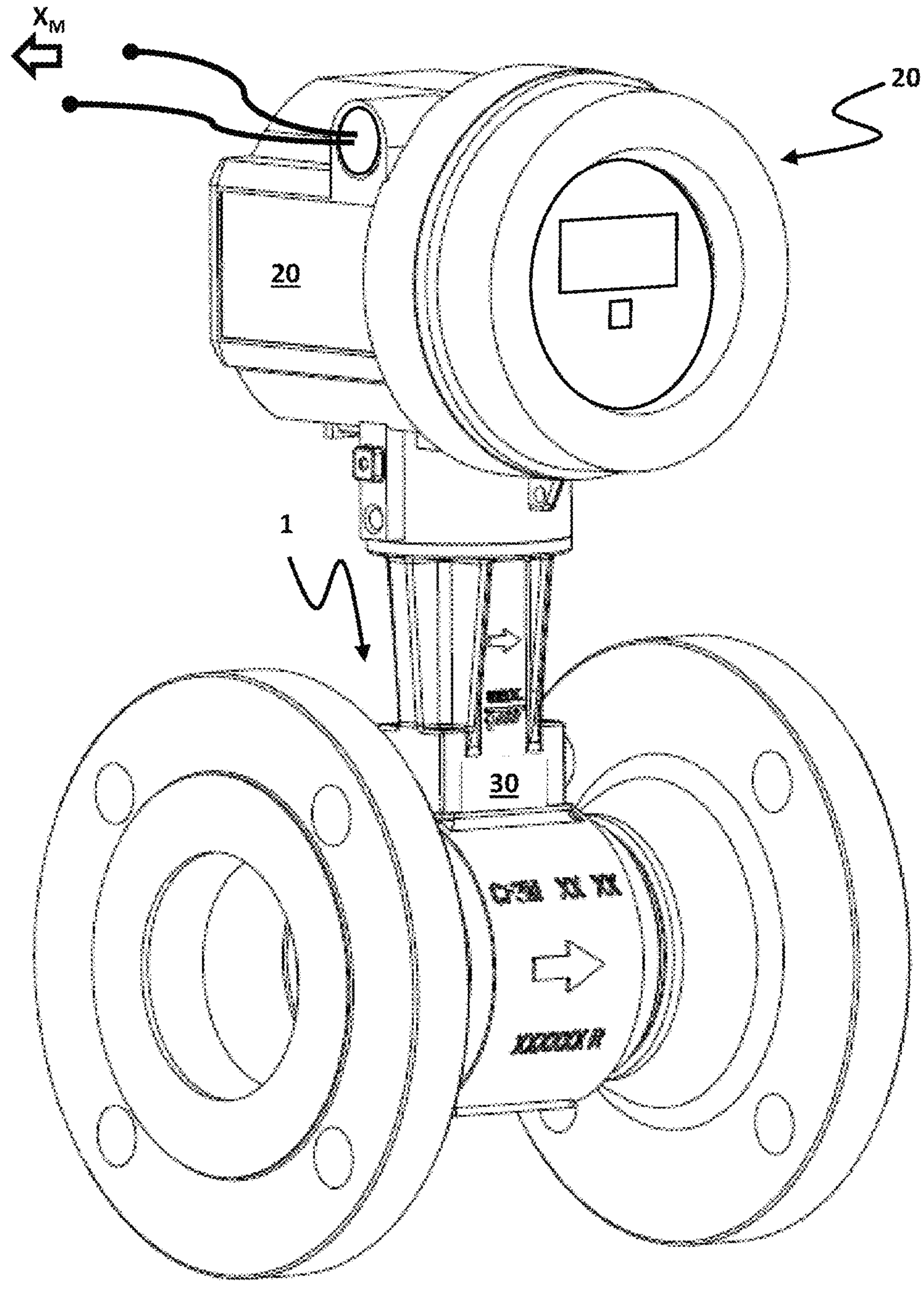
FIGS. 1 and 2 show various schematic views of an exemplary embodiment of a measurement system, in this case in the form of a vortex flow meter, having a sensor and measurement electronics system for measuring at least one flow parameter of a fluid flowing in a pipeline.
Figure 2:
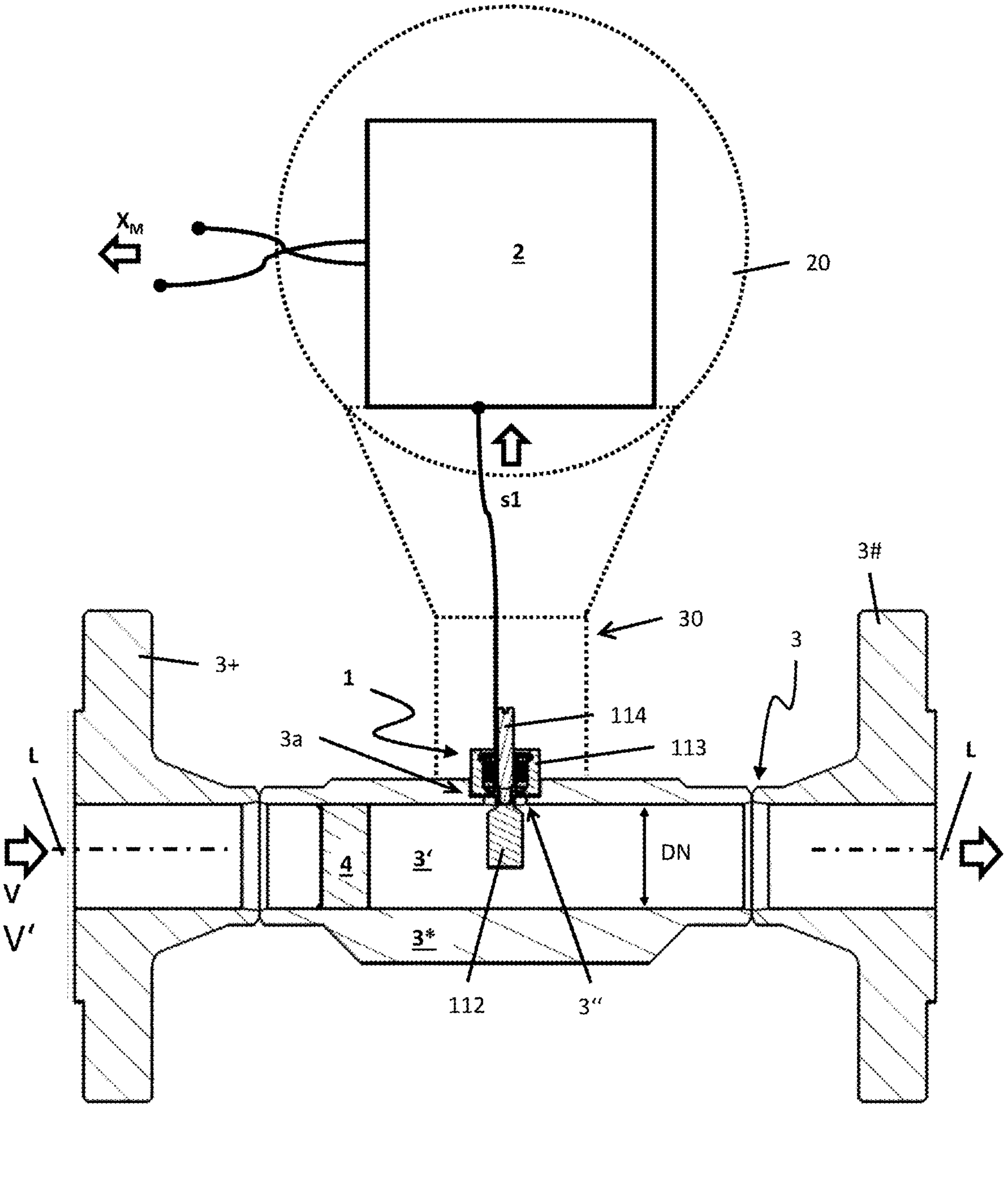

FIGS. 1 and 2 show an exemplary embodiment of a measurement system for measuring at least one flow parameter, possibly also variable over time, such as a flow velocity v and/or a volume flow rate V', a fluid flowing in a pipeline, e.g., a hot gas having, especially, at least temporarily a temperature of more than 200° C., and/or being at least temporarily under a high pressure, especially, of more than 100 bar. The pipe can be designed, for example, as a plant component of a heat supply network or of a turbine circuit, and therefore the fluid can, for example, be steam, especially saturated steam or superheated steam, or else, for example, a condensate discharged from a steam line. However, fluid can also, for example, be (compressed) natural gas or a biogas, so that the pipe can also be a component of a natural gas or biogas plant or of a gas supply network, for example.

Figure 3:
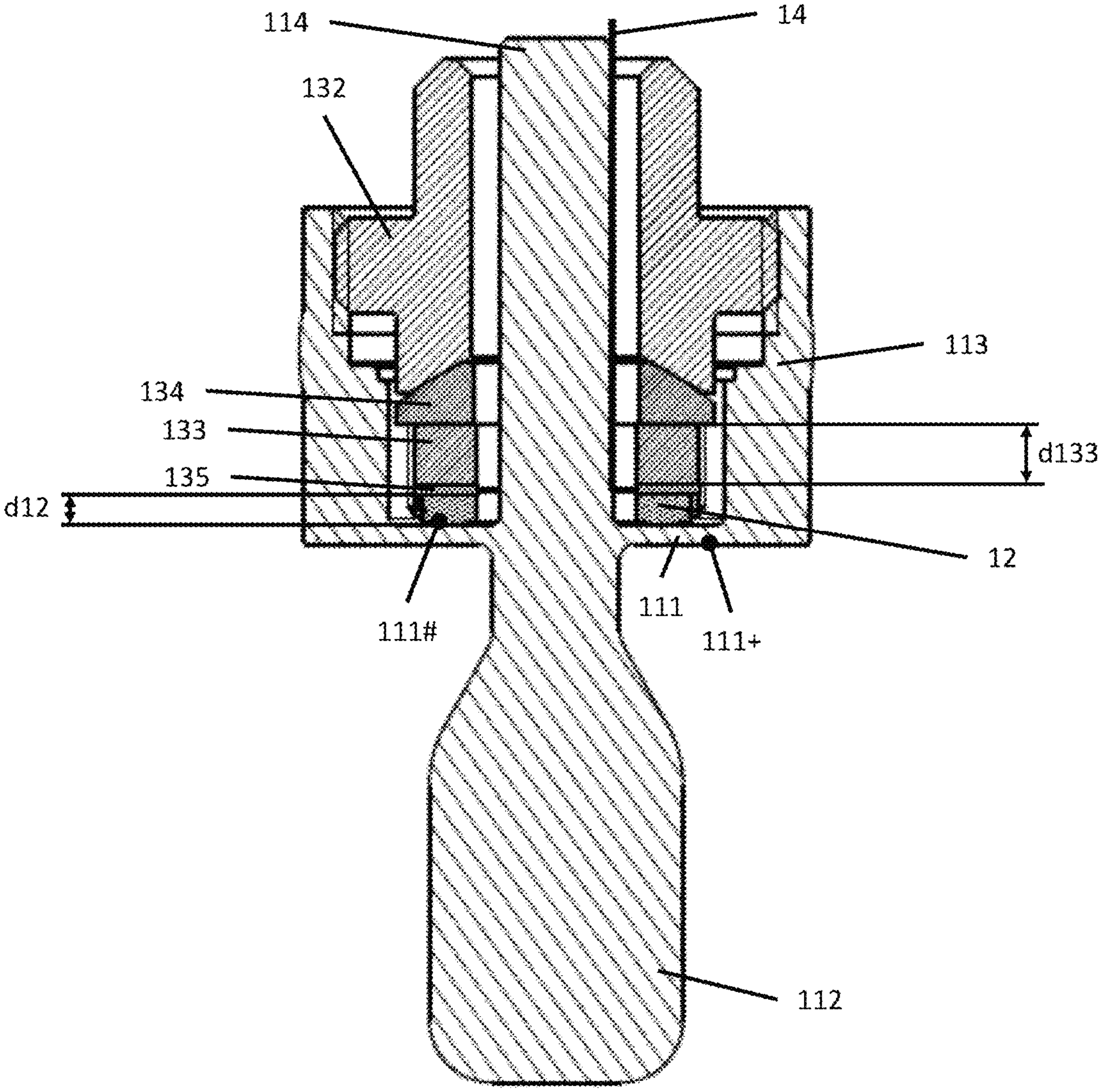
FIG. 3 shows, in a cut-away side view, an exemplary embodiment of a sensor suitable in particular for use in a measurement system according to FIG. 1 or 2.

The measurement system has a sensor 1, shown again enlarged in FIG. 3, which is provided or configured to detect pressure fluctuations in the fluid flowing past the sensor in a (main) flow direction and to convert it into a sensor signal s1 corresponding to said pressure fluctuations—for example, an electrical or optical sensor signal s1. As is apparent from FIGS. 1 and 2 when viewed together, the measurement system furthermore comprises a measurement electronics system 2—for example, accommodated in a pressure-resistant and/or impact-resistant protective housing 20—which is electrically connected to the sensor 1 or communicates with the sensor 1 during operation of the measurement system. The measurement electronics system 2 is, according to an embodiment of the invention, configured to receive and process the sensor signal s1, viz., for example, to generate measurement values XM representing the at least one flow parameter, i.e., for example, the flow velocity v or the volume flow rate V'. The measurement values XM can, for example, be visualized in situ and/or be transmitted in a wired manner via a connected field bus and/or in a wireless manner via radio to an electronic data processing system—for example, a programmable logic controller (PLC) and/or a process control station. Alternatively or in addition, the measuring electronics system 2 can also serve or be configured to feed an electrical driver signal into the transducer element—for example, for generating a force causing deformation of the deformation element. The protective housing 20 for the measurement electronics system 2 can in turn, for example, be produced from a metal, such as stainless steel or aluminum, and/or by means of a casting method, such as an investment casting or die casting method (HPDC); it can, however, for example, also be formed by means of a plastic molded part produced in an injection-molding method.

The sensor 1 comprises, as also shown in FIG. 3 or as is readily apparent from a combination of FIGS. 2 and 3, a deformation element 111, in particular a membrane-like or disk-shaped deformation element. The deformation element 111 further has a second surface 111 #, which is opposite the first surface 111+—for example, at least partially parallel to the first surface 111+. In addition, the sensor can further comprise a sensor lug 112 which has a left-hand first side surface and a right-hand second side surface, and which extends from a first surface 111+ of the deformation element 111 to a distal (free) end, viz., remote from the deformation element 111 or its surface 111+. The deformation element 111 and the aforementioned sensor lug 112 can, for example, be components of one and the same monolithic molded part that is cast or produced by an additive manufacturing process such as 3-D laser melting, for example; however, the deformation element and the sensor lug can also be designed as individual parts that are initially separate from one another and are only subsequently integrally bonded to one another, e.g., welded or soldered to one another, and therefore produced from materials that can correspondingly be integrally bonded to one another. The deformation element 111 can consist at least partially, e.g., predominantly or completely, of a metal, such as stainless steel or a nickel-based alloy, such as X7 CrNiAl 17-7 (WsNr 1.4568, EN 10027-2:1992-09). The aforementioned sensor lug 112 can likewise consist at least partially of a metal, e.g., a stainless steel or a nickel-based alloy, and/or the deformation element 111 and the sensor lug 112 can be produced from or consist of the same material. The deformation element 111 and the sensor lug 112 are moreover configured in particular to be excited into oscillations about a common static rest 9 position, typically, viz., forced oscillation out of resonance, in such a way that the sensor lug 112 executes pendular movements that elastically deform the deformation element 111 in a detection direction running substantially transversely to the aforementioned flow direction. The sensor lug 112 accordingly has a width, measured as a maximum extent in the direction of the flow direction, which is substantially greater than a thickness of the sensor lug 112, measured as a maximum lateral extent in the direction of the detection direction. Moreover, the sensor lug 112 can be designed, for example, as a wedge-shaped or also as a planar plate, as is quite common with such sensors.

The sensor 1 according to the invention further has a connection sleeve 113 which extends starting from a, for example, circular, circumferential edge segment of the second surface 111 # of the deformation element, and which is for example electrically conductively connected to the deformation element and/or made of metal. According to a further embodiment of the invention, the connection sleeve 113 is made of a material or metal which has a (linear) thermal expansion coefficient α1 of not less than $16\cdot10^{-6}$ $K^{-1}$ and/or not more than $17\cdot10^{-6}$ $K^{-1}$ at least within a temperature range between −10° C. and 250° C.

In order to detect mechanical oscillations of the deformation element 111 (or the deformation element 111 together with the sensor lug), the sensor furthermore has at least one, especially disk-shaped and/or piezoceramic, transducer element 12, which is arranged within the connection sleeve 113 and contacts the surface 111+ of the deformation element with a first contact face, for generating an electrical sensor signal representing temporally changing, especially at least temporarily periodic, movements of the sensor lug and/or likewise temporally changing, especially at least temporarily periodic, deformations of the deformation element 111—for example, with an electrical (alternating) voltage corresponding to the aforementioned movements. Alternatively or in addition, the transducer element 12 can also serve to generate a force that causes deformation of the deformation element 111 (inverse piezo effect), or to be used as a (piezoelectric) actuator—for example, for exciting mechanical oscillations of the deformation element. According to a further embodiment of the invention, the transducer element 12 is made of a material, e.g., a lead zirconate titanate (piezo) ceramic (PZT), which has a (linear) thermal expansion coefficient α2 of not less than $-6\cdot10^{-6}$ $K^{-1}$ and/or not more than $6\cdot10^{-6}$ $K^{-1}$ at least within a temperature range between −10° C. and 250° C. As already mentioned, the sensor 1 or the measurement system formed therewith is also in particular intended to be used in such applications or measuring points in which extremely high hydrostatic pressures, viz., pressures of over 100 bar acting vertically against the wall 3* of the pipe and thus equally acting against the sensor, and/or high (fluid) temperatures of over 200° C. can occur for a short time in the fluid to be measured, e.g., due to condensation-induced water hammers (CIWH)—for example, in superheated steam applications. In order to fix the transducer element 12 in the connection sleeve 113, in particular in a releasable manner, on the one hand, and to achieve the lowest possible sensitivity of the sensor to pressure surges and/or temperature fluctuations or to reduce measurement errors resulting from such high loads on the sensor when measuring the at least one flow parameter with the measurement system formed with said sensor, on the other, the sensor according to the invention further comprises fastening means 13 positioned within the connection sleeve 113 and mechanically connected thereto, in particular in a releasable manner. In the sensor according to the invention, the fastening means 13 comprise an (inner) threaded sleeve 132 having an external thread, e.g., made of a metal, and an add-on element 133, which is for example monolithic and/or cylindrical—for example, made of a metal or the same material as the connection sleeve 113. In addition, the connection sleeve 113 has an internal thread (for the threaded sleeve 132) in a distal end remote from the deformation element 111. As shown schematically in FIG. 3, the transducer element 12 has a (first) thickness d12, e.g., not less than 1 mm and/or not more than 2 mm, measured at a temperature of 20° C. as the maximum extension in the direction of a normal of its first contact face, and the add-on element 133 has a (second) thickness d131, e.g., not less than 0.5 mm and/or not more than 10 mm, measured at room temperature or a temperature of 20° C. as the maximum extension in the direction of the normal of the first contact face of the transducer element.

According to a further embodiment of the invention, the add-on element 133 is designed as a washer, e.g., also in the form of a shim washer or an adjusting or spacer washer, and/or is made of a material, e.g., a metal, which is different from the material of the deformation element and/or which has a (linear) thermal expansion coefficient α3 of not less than $20\cdot10^{-6}$ $K^{-1}$ and/or not more than $30\cdot10^{-6}$ $K^{-1}$ at least within a temperature range between −10° C. and 250° C. Alternatively or in addition, it is further provided that the add-on element 133 consist of aluminum or an aluminum alloy—for example, an aluminum-magnesium-silicon alloy (AlMgSi) or a wrought aluminum alloy, in particular of the (standardized) type EN AW-6061 (AlMg1SiCu), EN AW-6082, EN AW-7075, or EN AW-5052.

The (inner) threaded sleeve 132 is furthermore screwed into the inner thread of the connection sleeve 113 to form an abutment for the add-on element 133, and the shim element 131 is positioned between the (inner) threaded sleeve 132 and the transducer element 12. In addition, the inner) threaded sleeve is screwed into the connection sleeve 113 to such an extent that at least the add-on element 131 (in the installed state) is elastically deformed by exerting a contact pressing force that holds the transducer element 12 pressed against the deformation element 111, whereby a frictional connection is also formed between the transducer element 12 and the deformation element 111; this occurs in particular in such a way that a minimum surface pressure acting between the add-on element 131 and the transducer element 12 or between the transducer element 12 and the deformation element 111 is more than 1 MPa, in particular more than 3 MPa, at least within a temperature range between −10° C. and 250° C., and/or that a maximum surface pressure acting between the add-on element 131 and the transducer element 12 or between the transducer element 12 and the deformation element 111 is less than 20 MPa, in particular less than 15 MPa, at least within a temperature range between −10° C. and 250° C. The required (nominal) contact force or (nominal) surface pressure can be precisely adjusted during assembly of the sensor—for example, by means of an appropriately programmed screwing tool, such as a programmable electronic torque and/or angle wrench. Not least in order to achieve a surface pressure that is set as precisely as possible or remains set even over a wide temperature range, e.g., between −10° C. and 250° C., according to a further embodiment of the invention, the transducer element 12 and the add-on element 133 are designed such that an expansion difference ratio $\Delta\alpha 21/\Delta\alpha 31$ (of the sensor), measured as a ratio of a difference between the aforementioned (linear) thermal expansion coefficient $\alpha 2$ (of the material) of the transducer element 12 and a (linear) thermal expansion coefficient $\alpha 1$ (of the material) of the connection sleeve 113 to a difference between a (linear) thermal expansion coefficient $\alpha 3$ (of the material) of the add-on element 133 and the (linear) thermal expansion coefficient $\alpha 1$ (of the material) of the connection sleeve 113, in particular at least within the above-mentioned temperature range of between −10° C. and 250° C., fulfills a condition dependent upon a (fine-tuning) parameter k1:

$$\frac{d_{133}}{d_{12}} = -k1 \cdot \frac{\Delta\alpha_{21}}{\Delta\alpha_{31}} = -k1 \cdot \frac{\alpha_2 - \alpha_1}{\alpha_3 - \alpha_1}$$

where the (fine-tuning) parameter k1 is not less than 0.5 and not greater than 1.5—for example, even greater than 0.7 and/or less than 1.2. It may also be advantageous to select the thickness $d_{133}$ and the thickness $d_{12}$ such that a (thickness) ratio $d_{133}/d_{12}$ (of the thickness $d_{133}$ of the add-on element 133 to the thickness d12 of the transducer element 12) is more than 0.5 and less than 7—for example, not less than 2 and/or not more than 4.

In order to prevent a lateral displacement of the transducer element 12 in the installation position relative to the deformation element 111 or to the connection sleeve 113, the connection sleeve 113 and the transducer element 12 can advantageously also be designed such that an inner diameter of the connection sleeve 113 in the region of the installation position of the transducer element substantially corresponds to an outer diameter of the transducer element 12 corresponding thereto—for example, that said inner diameter is larger only by an amount which barely allows for positioning the transducer element 12 on the deformation element 111. In order to facilitate positioning of the transducer element 12, the connection sleeve 113 can further be designed such that it has a (smallest) inner diameter in a region above the transducer element 12 (positioned in the installed position), which is greater than a (largest) outer diameter of the transducer element 12—for example, by more than 1 mm. Alternatively or in addition, the fastening means can also comprise a spherical disk 134, which is positioned (in the installed position) between the (inner) threaded sleeve and the add-on element 133, not least for the purpose of simplifying assembly and/or compensating for any manufacturing-related tolerances of the threaded sleeve and/or of the add-on element. The, for example, annular, spherical disk 134 can advantageously consist at least partially, e.g., also predominantly or completely, of a metal, in particular a stainless steel or a nickel-based alloy, and/or of a material which has a (linear) thermal expansion coefficient $\alpha 4$ of not less than $16 \cdot 10^{-6}$ $K^{-1}$ and/or not more than $17 \cdot 10^{-6}$ $K^{-1}$ at least within a temperature range between −10° C. and 250° C. In addition, the (linear) thermal expansion coefficient $\alpha 4$ (of the material) of the spherical disk can advantageously also be selected such that it deviates from the aforementioned (linear) thermal expansion coefficient $\alpha 1$ (of the material) of the connection sleeve 113 by less than $2 \cdot 10^{-6}$ $K^{-1}$ and/or by less than 10% of the thermal expansion coefficient $\alpha 1$ (of the material) of the connection sleeve 113 at least within a temperature range between −10° C. and 250° C.

Figure 4A:
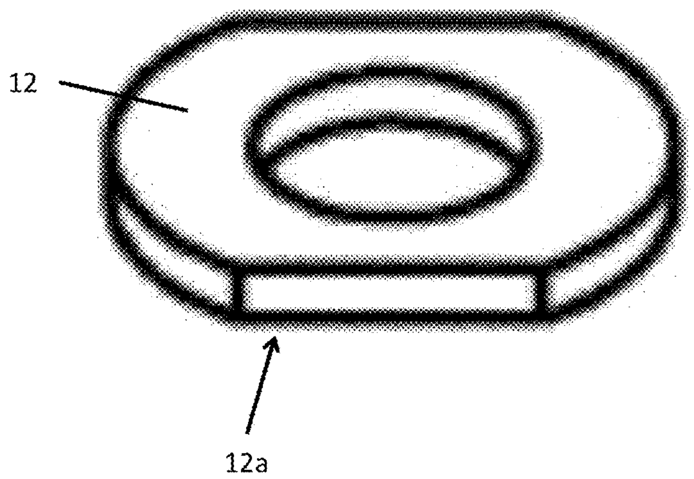
FIGS. 4*a* and 4*b* show, in two different side views, an exemplary embodiment of a transducer element suitable for a sensor according to FIG. 3.
Figure 4B:
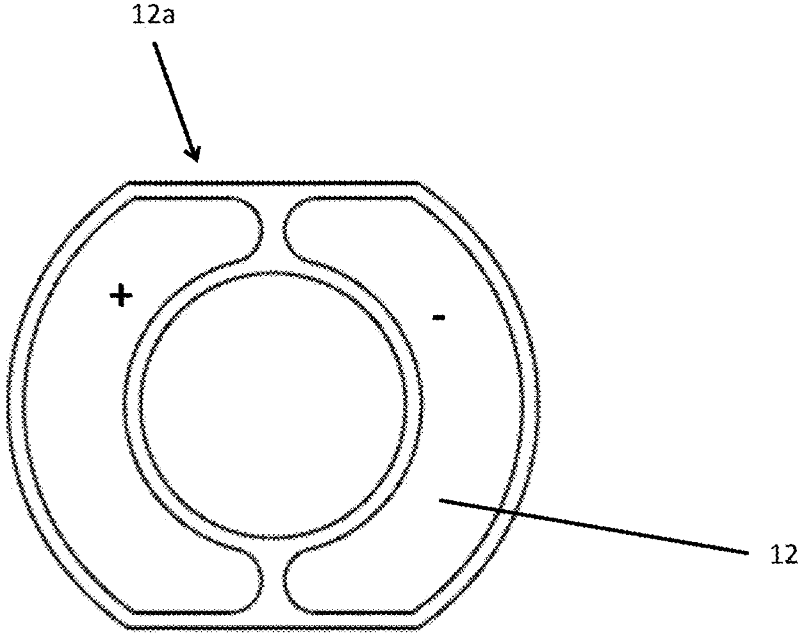

In order to ensure correct orientation of the transducer element 12 in the installation position, not least also with regard to an electrical polarization of the ceramic forming the transducer element 12 or with regard to a correct position of positively (+) or negatively (−) polarized partial regions of the transducer element 12, the transducer element 12 and the connection sleeve 113 can also be shaped such that the transducer element 12 and the connection sleeve 113 have outer or inner contours that are complementary to each other, but nevertheless prevent an incorrect installation position of the transducer element, e.g., such that, as shown in FIGS. 4*a* and 4*b* or as apparent from those figures when viewed together, the transducer element 12 has an outer contour with one or more straight sections 12*a*, and that the connection sleeve 113 has an inner contour with straight sections corresponding to the above-mentioned straight sections of the transducer element 12.

By using such fastening means formed by means of the (inner) threaded sleeve 132 and the add-on element 133, it is also possible, inter alia, to fix the transducer element on the deformation element 111 without the transducer element 12 and the deformation element 111 being or having to be integrally bonded to one another, and therefore, for example, the use of adhesives or solders for connecting the transducer element 12 and the deformation element 111 can be dispensed with. Likewise, the add-on element 133 and the transducer element 12 can also be bonded to one another in a non-integral manner, viz., by avoiding an adhesive bond that would bond the add-on element 133 and transducer element to one another; therefore, the use of adhesives or solders can be dispensed with here as well. On the other hand, the use according to the invention of the add-on element 133, however, also makes it easily possible to position a metal foil, e.g., a silver foil, between the transducer element 12 and the deformation element 111, which foil serves to bring about an electrically good conductive connection between the transducer element 12 and the deformation element 111 and/or to bring about an as uniform as possible mechanical contact between the transducer element 12 and the deformation element 111. Furthermore, it is also easily possible to place further elements of the fastening means 13 between the transducer element 12 and the add-on element 131—for example, viz., one or more insulating disks (135), which are electrically insulating and optionally also designed as a contact disk or (flexible) printed circuit board. According to a further embodiment of the invention, the fastening means accordingly comprise at least one insulating disk 135 which is, for example, annular and/or formed by means of a flexible printed circuit board, e.g., made of a ceramic and/or a plastic and/or made of a material having a (linear) thermal expansion coefficient $\alpha 5$ of not less than $30 \cdot 10^{-6}$ $K^{-1}$ and/or not more than $50 \cdot 10^{-6}$ $K^{-1}$ at least within a temperature range between −10° C. and 250° C., which insulating disk is positioned between the transducer element 12 and the add-on element 133. Advantageously, the insulating disk 135 can also consist at least partially, e.g., also predominantly or completely, of a plastic, in particular a plastic that is resistant to high temperatures and/or a plastic that has a (linear) thermal expansion coefficient $\alpha 5$ of at least $20 \cdot 10^{-6}$ $K^{-1}$ and/or not more than $40 \cdot 10^{-6}$ $K^{-1}$ at least within a temperature range between −10° C. and 250° C., e.g., a polyimide, in particular Kapton, or a plastic with a (linear) thermal expansion coefficient $\alpha 5$ that deviates from the (linear) thermal expansion coefficient $\alpha 2$ (of the material of the add-on element 133) at least within a temperature range between −10° C. and 250° C. by less than 20·106 $K^{-1}$ and/or by less than 50% of the (linear) thermal expansion coefficient α2, and/or the insulating disk 135, not least also in the above-described case that the insulating disk is made of polyimide, in particular Kapton, can have a (third) thickness d3 of not less than 0.05 mm and/or not more than 0.5 mm, measured at a temperature of 20° C. as the maximum extension in the direction of the normal of the above-mentioned first contact face of the transducer element 12, and can therefore also be designed as a (polyimide) film. Alternatively or additionally, the insulating disk 135 can have electrically conductive conductor tracks positioned thereon and/or can be electrically conductively connected to the electrical connecting line 14, and the insulating disk 135 can be positioned such that, in the installed position, it electrically conductively contacts a second contact face of the transducer element 12 opposite the aforementioned first contact face of the transducer element 12.

According to a further embodiment of the invention, the measurement system further comprises a tube 3 that can be inserted in the course of the aforementioned pipe and has a lumen 3' that is surrounded by a wall 3*, e.g., a metallic wall, of the tube and extends from an inlet end 3+ to an outlet end 3 # and is configured to guide the fluid flowing in the pipe. The sensor 1 is moreover inserted into said tube in such a way that the first surface of the deformation element 111 faces the lumen 3' of the tube, so that the sensor lug projects into said lumen. In the exemplary embodiment shown here, there is at both the inlet end 3+ and the outlet end 3 # a flange, which is used in each case to produce a leak-free flange connection to a respective corresponding flange on an inlet-side or outlet-side line segment of the pipe. Furthermore, as shown in FIG. 1 or 2, the tube 3 can be substantially straight, viz., for example, in the form of a hollow cylinder with a circular cross-section in such a way that the tube 3 has an imaginary straight longitudinal axis L connecting the inlet end 3+ and the outlet end 3 #. In the exemplary embodiment shown in FIG. 1 or 2, the sensor 1 is inserted into the lumen of the pipe from the outside through an opening 3" formed in the wall and is fixed, e.g., also releasably, from the outside to the wall 3* in the region of said opening in such a way that the surface 111+ of the deformation element 111 faces the lumen 3' of the pipe 3, and therefore the sensor lug 112 protrudes into said lumen. Especially, the sensor 1 is inserted into the opening 3" in such a way that the deformation element 111 covers or hermetically seals the opening 3". Said opening can be designed, for example, in such a way that it has, as is quite usual in measurement systems of the type in question, an (inner) diameter in a range between 10 mm and approximately 50 mm. According to a further embodiment of the invention, a socket **3*a* used to hold the deformation element or the sensor 1 formed therewith on the wall 3* is formed in the opening 3". In this case, the sensor 1 can, for example, be fixed to the tube 3 by integral bonding, especially by welding or soldering, of the deformation element 111 and wall 3*; however, it can for example also be detachably connected to the tube 3, viz., for example, screwed thereto or screwed thereon. Furthermore, at least one sealing face, e.g., also a circumferential or circular-ring-shaped sealing face, can be formed in the socket 3*a* and is configured to seal the opening 3" correspondingly in cooperation with the deformation element 111 and an optionally provided, e.g., annular or annular disk-shaped, sealing element. According to a further embodiment of the invention, the sensor 1 and the tube 3 are further dimensioned such that a length of the sensor lug 112, measured as the minimum distance between a proximal end of the sensor lug 112, viz., the end bordering the deformation element 111 and the distal end of the sensor lug 112, corresponds to more than half of a caliber DN of the tube 3 and less than 95% of said caliber DN. For example, the length of the sensor lug 112 can also be selected, as is quite usual with a comparatively small caliber of less than 50 mm, in such a way that said distal end of the sensor lug 112 has only a very small minimum distance from the wall 3* of the tube 3. In the case of pipes with a comparatively large caliber of 50 mm or more, the sensor lug 112 can also, as is quite usual in the case of measurement systems of the type in question or as can also be seen from FIG. 2, be significantly shorter than half of a caliber of the pipe 3**, for example.

In the exemplary embodiment shown in FIG. 1 or 2, the measurement system is specifically designed as a vortex flow meter with a resistance element 4 arranged in the lumen of the tube 3—here, viz., upstream of sensor 1, viz., in the (main) direction of flow upstream of the sensor—and serving to bring about a Kármán vortex street in the flowing fluid. Here, the sensor and the resistance element are, especially, dimensioned and arranged such that the sensor lug 112 projects into the lumen 3* of the tube, or into the fluid conducted, in such a region which during operation of the measurement system is regularly taken up by a (stationarily formed) Karman vortex street, so that the pressure fluctuations detected by means of the sensor 1 are periodic pressure fluctuations caused by vortices shed at the resistance element 4 at a separation rate ($\sim 1/f_{Vtx}$), and the sensor signal s1 has a signal frequency ($\sim f_{Vtx}$) corresponding to the separation rate of said vortices. In the exemplary embodiment shown here, the vortex flow meter is moreover designed as a compact-type measurement system in which the measurement electronics system 2 is accommodated in a protective housing 20 held on the tube—for example, by means of a neck-like connection piece 30.

According to a further embodiment of the invention, in order to compensate for forces and/or moments resulting from random movements of the sensor, e.g., as a result of vibration of the aforementioned pipe connected to the tube, or to avoid undesired movements of the sensor lug or of the deformation element 111 resulting therefrom, viz., that distort the sensor signal s1, the sensor 1 further has a compensating element 114, e.g., a rod-shaped, planar, or sleeve-shaped compensating element, extending from the second surface 111 # of the deformation element 111. The compensating element 114 can, for example, consist of the same material as the deformation element and/or the sensor lug—for example, a metal. For example, the compensating element 114 can be produced from stainless steel or a nickel-based alloy. According to a further embodiment of the invention, the deformation element 111 and the compensating element 114 are integrally bonded to one another, e.g., welded or soldered to one another, and therefore the compensating element 114 and the deformation element 111 are produced from materials that can be integrally bonded to one another accordingly. Alternatively, however, the deformation element 111 and the compensating element 114 can also be components of one and the same monolithic molded part—for example, also in such a way that the sensor lug 111, the deformation element 112 and the compensating element 114 are components of said molded part. The sensor lug 112 and the compensating element 114 can also be arranged in alignment with one another, as can also be seen by viewing FIGS. **3*c* and 3*d* together, in such a way that a main axis of inertia of the sensor lug 112 coincides in extension with a main axis of inertia of the compensating element 114. Alternatively or in addition, the compensating element 114 and the deformation element 111 can also be positioned and aligned with one another such that a main axis of inertia of the deformation element 111 coincides in extension with a main axis of inertia of the compensating element 114. According to a further embodiment of the invention, the compensating element 114 and the add-on element 133 are also designed and arranged such that the compensating element 114 extends through the add-on element 133**, e.g., in such a way that a main axis of inertia, viz., for example, a longitudinal axis of the compensating element and a main axis of inertia, viz., for example, a longitudinal axis of the add-on element, run parallel to one another, viz., for example, so as to be coincident, and/or in such a way that the add-on element and the compensating element do not contact one another.

The invention claimed is:

1. A sensor for detecting pressure fluctuations in a fluid, the sensor comprising:

a deformation element which is flat at least in sections, generally disk-shaped, and made of a metal, including a planar first surface and an opposite planar second surface;

a connection sleeve extending from the deformation element and connected thereto in an electrically conductive manner, wherein the connection sleeve is made of a material having a first thermal expansion coefficient of not less than $16 \cdot 10^{-6}$ $K^{-1}$ and/or not more than $17 \cdot 10^{-6}$ $K^{-1}$ at least within a temperature range of −10° C. to 250° C.;

a generally disk-shaped, piezoceramic transducer element which is disposed within the connection sleeve, electrically conductively contacts the second surface of the deformation element with a first contact face, and is made of a material having a second thermal expansion coefficient of not less than $-6 \cdot 10^{-6}$ $K^{-1}$ and/or not more than $6 \cdot 10^{-6}$ $K^{-1}$ at least within a temperature range of −10° C. to 250° C., wherein the transducer element is configured to generate an electric sensor signal representing deformations of the deformation element, which change over time and are at least temporarily periodic, and/or is configured to generate a force effecting deformations of the deformation element; and fastening means disposed within the connection sleeve and at least partially, releasably, mechanically connected thereto and configured to releasably fix the transducer element in the connection sleeve, wherein the connection sleeve includes an internal thread in a distal end remote from the deformation element, wherein the fastening means include:

an inner threaded sleeve including an external thread; and a cylindrical, monolithic, and/or disk-shaped add-on element made of a metal and/or of a material having a third thermal expansion coefficient of not less than $20 \cdot 10^{-6}$ $K^{-1}$ and/or not more than $30 \cdot 10^{-6}$ $K^{-1}$ at least within a temperature range of −10° C. to 250° C., wherein the threaded sleeve is screwed into the internal thread of the connection sleeve, with the add-on element disposed between the threaded sleeve and the transducer element, such that an abutment for the add-on element is formed by the threaded sleeve and such that at least the add-on element is elastically deformed by exerting a contact pressing force that holds the transducer element pressed against the deformation element or is elastically deformed by forming at least a frictional connection that connects the transducer element and the deformation element to each other, in particular such that a minimum surface pressure acting between the add-on element and the transducer element or between the transducer element and the deformation element is more than 1 MPa, and/or a maximum surface pressure acting between the add-on element and the transducer element or between the transducer element and the deformation element is less than 20 MPa, and/or such that a frictional connection is formed between the transducer element and the deformation element.

2. The sensor according to claim 1, wherein a minimum surface pressure acting between the add-on element and the transducer element or between the transducer element and the deformation element, at a temperature above −50° C. and below 250° C., is more than 1 MPa, and/or wherein a maximum surface pressure acting between the add-on element and the transducer element or between the transducer element and the deformation element, at a temperature above −50° C. and below 250° C., is less than 20 MPa.

3. The sensor according to claim 2, wherein the minimum surface pressure is more than 3 MPa, and/or the maximum surface pressure is less than 15 MPa.

4. The sensor according to claim 1, wherein the add-on element consists of an aluminum-magnesium-silicon alloy or a wrought aluminum alloy of industrial standard type EN AW-6061, EN AW-6082, EN AW-7075 or EN AW-5052.

5. The sensor according to claim 1, wherein, at least one of:

the add-on element consists of a metal, in particular aluminum or an aluminum alloy;

the deformation element consists at least partially, especially predominantly or completely, of a metal, especially stainless steel or a nickel-based alloy;

the connection sleeve consists at least partially, especially predominantly or completely, of a metal, especially stainless steel or a nickel-based alloy; and the add-on element and the deformation element consist of different materials.

6. The sensor according to claim 1, wherein:

the transducer element has a first thickness of not less than 0.5 mm and/or not more than 2 mm, measured at a temperature of 20° C., as the maximum extension in a direction of a normal of its first contact face;

the add-on element has a second thickness of not less than 1 mm and/or not more than 10 mm, measured at a temperature of 20° C., as the maximum extension in the direction of the normal of the first contact face of the transducer element; and the transducer element and the add-on element are configured such that an expansion difference ratio of the sensor, measured as a ratio of a difference between the second thermal expansion coefficient and the first thermal expansion coefficient to a difference between the third thermal expansion coefficient and the first thermal expansion coefficient, at least within a temperature range of −10° C. to 250° C., fulfills a condition dependent upon a tuning parameter such that:

$$\frac{d_{133}}{d_{12}} = -k1 \cdot \frac{\Delta\alpha_{21}}{\Delta\alpha_{31}} = -k1 \cdot \frac{\alpha_2 - \alpha_1}{\alpha_3 - \alpha_1},$$

wherein $k_1$ is the tuning parameter, d133 is the thickness of the add-on element, d12 is the thickness of the transducer element, α1 is the thermal expansion coefficient of the material of the connection sleeve, α2 is the thermal expansion coefficient of the material of the transducer element, and α3 is the thermal expansion coefficient of the material of the add-on element, and wherein the tuning parameter $k_1$ is not less than 0.5 and not greater than 1.5.

7. The sensor according to claim 6, wherein the tuning parameter is greater than 0.7 and/or less than 1.2.

8. The sensor according to claim 6, wherein a thickness ratio ($d_{133}/d_{12}$) of the thickness of the add-on element to the thickness of the transducer element is more than 0.5 and less than 7.

9. The sensor according to claim 8, wherein the thickness ratio is not less than 2 and/or not more than 4.

10. The sensor according to claim 1, wherein the fastening means comprises an annular, spherical washer made of a metal and/or of a material having a fourth thermal expansion coefficient of not less than $16 \cdot 10^{-6}$ $K^{-1}$ and/or not more than $17 \cdot 10^{-6}$ $K^{-1}$ at least within a temperature range between −10° C. and 250° C., and wherein the spherical washer is disposed between the threaded sleeve and the add-on element.

11. The sensor according to claim 10, wherein the spherical washer consists at least partially, especially predominantly or completely, of a metal, especially stainless steel or a nickel-based alloy, and/or wherein the fourth thermal expansion coefficient of the spherical disk deviates from the first thermal expansion coefficient of the connection sleeve, at least within a temperature range between −10° C. and 250° C., by less than $2 \cdot 10^{-6}$ $K^{-1}$ and/or by less than 10% of the first thermal expansion coefficient.

12. The sensor according to claim 1, wherein, at least one of:

the transducer element and the deformation element are not integrally bonded to each other;

the transducer element and the add-on element are not integrally bonded to each other; and the transducer element electrically conductively contacts the deformation element and/or the connection sleeve.

13. The sensor according to claim 1, wherein the fastening means comprises an annular, insulating disk made of a ceramic and/or a plastic and/or made of a material having a fifth thermal expansion coefficient of not less than $30 \cdot 10^{-6}$ $K^{-1}$ and/or not more than $50 \cdot 10^{-6}$ $K^{-1}$ at least within a temperature range between −10° C. and 250° C.; and wherein the insulating disk is disposed between the transducer element and the add-on element.

14. The sensor according to claim 13, wherein, at least one of:

the insulating disk consists at least partially, in particular predominantly or completely, of a plastic, in particular a polyimide (Kapton®), in particular a plastic that is resistant to high temperatures and/or has a sixth thermal expansion coefficient of not less than $20 \cdot 10^{-6}$ $K^{-1}$ and/or not more than $40 \cdot 10^{-6}$ $K^{-1}$ within a temperature range between −10° C. and 250° C.;

wherein the sixth thermal expansion coefficient of the insulating disk deviates from the second thermal expansion coefficient of the add-on element by less than $20 \cdot 10^{-6}$ $K^{-1}$ and/or by less than 50% of the second thermal expansion coefficient, at least within a temperature range between −10° C. and 250° C.; and wherein the insulating disk has a thickness, measured at a temperature of 20° C. as the maximum extension in a direction of a normal of the first contact face of the transducer element, which thickness is not less than 0.05 mm and/or not more than 0.5 mm.

15. The sensor according to claim 1, further comprising a rod-shaped, planar, or wedge-shaped sensor lug extending from the first surface of the deformation element.

16. The sensor according to claim 15, wherein, at least one of:

the deformation element and the sensor lug are integrally bonded to each other, namely, welded or soldered to each other;

the deformation element and the sensor lug are components of one and the same monolithic molded part;

the sensor lug consists at least partially, especially predominantly or completely, of a metal, especially stainless steel or a nickel-based alloy;

the deformation element and the sensor lug consist of an identical material; and the electrical sensor signal of the transducer element represents movements of the sensor lug, which change over time at least temporarily periodically.

17. The sensor according to claim 16, further comprising a rod-shaped, planar, sleeve-shaped compensating element extending from the second surface of the deformation element and configured to compensate for forces and/or torques resulting from common movements of the deformation element and the sensor lug.

18. The sensor according to claim 17, wherein, at least one of:

the compensating element extends through the add-on element such that a main axis of inertia of the compensating element and a main axis of inertia of the add-on element run parallel to each other and/or such that the add-on element and the compensating element do not contact each other;

the deformation element and the compensating element are integrally bonded to each other, namely, welded or soldered to each other;

the sensor lug and the compensating element are arranged in alignment with each other;

the compensating element and the deformation element are disposed and aligned with respect to each other such that a main axis of inertia of the deformation element extends as an extension parallel to the main axis of inertia of the compensating element;

the deformation element and the compensating element are components of one and the same monolithic, molded part such that the sensor lug, deformation element and compensating element and/or such that the connection sleeve, deformation element and compensating element are components of the molded part;

the deformation element consists at least partially, especially predominantly or completely, of a metal, especially stainless steel or a nickel-based alloy; and the deformation element and the compensating element consist of an identical material such that the sensor lug, deformation element, and compensating element and/or the connection sleeve, deformation element, and compensating element consist of the same material.

19. A measurement system for measuring at least one flow parameter, which is variable over time, of a fluid flowing in a pipe, the measurement system comprising:

a sensor according to claim 1 configured to detect pressure fluctuations in the flowing fluid; and measuring electronics electrically connected to the transducer element of the sensor, which measuring electronics are configured to receive and process the sensor signal from the sensor to generate measurement values representing the at least one flow parameter and/or configured to feed an electrical driver signal into the transducer element to generate a force causing deformation of the deformation element.

20. The measurement system according claim 19, further comprising a tube configured to be introduced into a course of the pipeline, the tube having a lumen configured to guide the fluid flowing in the pipeline, wherein the sensor is introduced into the tube such that the first surface of the deformation element faces the lumen of the tube and that the sensor lug projects into the lumen.

21. The measurement system according to claim 19, further comprising a tube configured to be introduced into a course of the pipeline, the tube having a lumen configured to guide the fluid flowing in the pipeline, wherein the tube includes an opening in a wall of the tube and a socket about the opening, which socket is configured to hold the deformation element on the wall, and wherein the sensor is introduced into the opening such that the deformation element hermetically seals the opening and/or that the first surface of the deformation element faces the lumen of the tube.

22. The measurement system according to claim 21, comprising a sensor according to claim 17, wherein the sensor lug extends into the lumen of the tube, and wherein the sensor lug has a length, measured as a minimum distance between a proximal end of the sensor lug, which proximal end adjoins the deformation element, to a distal end of the sensor lug, which distal end is remote from the deformation element or its surface, wherein the length corresponds to less than 95% of a caliber of the tube and/or more than one half of the caliber.

23. The measurement system according to claim 19, further comprising a resistance element arranged in the lumen of the tube upstream of the sensor relative to a direction of a bulk flow of the fluid, which resistance element is configured to generate a Kármán vortex street in the flowing fluid.

24. The measurement system according to claim 23, wherein the sensor is suitably arranged for detecting pressure fluctuations caused by a Kármán vortex street established within the flowing fluid.

25. A method for measuring a flow parameter of a fluid flowing in a pipe, the method comprising measuring the flow parameter using the measurement system according to claim 19, wherein the fluid is a steam at least temporarily at a temperature of more than 200° C. and/or acting at least temporarily with a pressure of more than 100 bar on the deformation element and/or the sensor lug of the sensor, and wherein the flow parameter is at least one of a flow velocity, a volume flow rate, and/or a mass flow rate.

* * * * *